United States Patent [19]

Vidal et al.

[11] 4,335,148

[45] Jun. 15, 1982

[54] METHODS OF PREVENTING GRAIN SPROUTING AFTER HARVEST THROUGH THE APPLICATION OF SULFUR DIOXIDE, NITROGEN AND AMMONIA GASES

[75] Inventors: Frederick D. Vidal, Englewood Cliffs; Anantharman Jayaraman, Nutley, both of N.J.

[73] Assignee: Pennwalt Corporation, Philadelphia, Pa.

[21] Appl. No.: 176,708

[22] Filed: Aug. 11, 1980

Related U.S. Application Data

[60] Continuation-in-part of Ser. No. 156,501, Jun. 4, 1980, Pat. No. 4,309,451, which is a division of Ser. No. 50,162, Jun. 20, 1979, abandoned, and a continuation-in-part of Ser. No. 38,739, May 14, 1979, abandoned.

[51] Int. Cl.$^3$ .......................... A23B 9/00; A23L 3/34
[52] U.S. Cl. .................... 426/319; 426/331; 426/618; 422/28; 424/164
[58] Field of Search .............. 426/321, 331, 335, 312, 426/319, 320, 532, 442, 618, 259; 424/317, 161, 162, 164, 166, 175, 127, 149; 422/28

[56] References Cited

U.S. PATENT DOCUMENTS

| 1,524,494 | 1/1925 | Warth | 424/162 |
|---|---|---|---|
| 1,777,044 | 9/1930 | Legendre | 426/319 |
| 2,132,786 | 10/1938 | Hockenyos | 424/162 |
| 2,912,793 | 11/1959 | Stone et al. | 424/162 |
| 3,404,987 | 10/1968 | Kooistra et al. | 426/9 |
| 3,725,081 | 4/1973 | Barham et al. | 426/281 |
| 3,928,577 | 12/1975 | Kochurova et al. | 426/335 |
| 3,962,475 | 6/1976 | Forest et al. | 426/331 |

OTHER PUBLICATIONS

Chemical Abstracts, vol. 91, 1979, Abstract No. 33,711q.
Chemical Abstracts, vol. 66, 1967, Abstract No. 27779k.
Chemical Abstracts, vol. 87, N. 19, p. 451, Nov. 1977, Abst. No. 150449p.
Foods, vol. 72, p. 293, 1970, Abstract No. 2303m.
Thermodynamics, vol. 88, p. 427, 1976, Abstract No. 137947x.
Chemical Abstracts, vol. 76, p. 329, 1972, Abst. No. 50552w.
Air Pollutions and Industrial Hygiene, vol. 75, p. 167, 1971, Abst. No. 100985s.
Chemical Abstracts, vol. 53, 1959, Cols. 22770-22771.
Chertkov, B. A.; Zhur. Priklad. Khim., 32, pp. 1732-2742, 1959.
Catalysis, Kinetics, vol. 78, p. 309, 1973, Abst. No. 20686s.
Chemical Abstracts, vol. 83, p. 600, 1976, Abst. No. 187726v.
Kirk-Othmer, Encyclopedia of Chemical Technology, 2nd ed., pp. 90-91.
Mizoguchi, T. et al., Bulletin of the Chemical Society of Japan, vol. 49, No. 1, 1976, pp. 70-75.
Chertkov, B. A. et al., Soviet Chemical Industry, vol. 49, N. 6, 1973, pp. 383-387.
Ibrahim et al., Baker's Digest, Oct. 1979, pp. 17-19.
Hawley, Gessner G., The Condensed Chemical Dictionary, 9th ed., Van Nostrand Reinhold Co., N.Y., ©1977, p. 827.
Chakrabarti, "Effects of Air Pollutants on Seed Germinability", Bull. Environm. Contam. Toxicol. 21, pp. 749-755, (1979).

Primary Examiner—Thomas G. Wiseman
Assistant Examiner—Elizabeth J. Curtin
Attorney, Agent, or Firm—Woodcock, Washburn, Kurtz, Mackiewicz & Norris

[57] ABSTRACT

Novel methods for treating grain, particularly wheat, to prevent sprouting are disclosed. These methods include applications of sulfur dioxide gas to grain in amounts which are effective to prevent sprouting. In an alternate method, nitrogen gas is applied to grain to enhance the anti-sprouting activity of sulfur dioxide. Ammonia gas may also be subseqently perfused into the treated grain mass in amounts which are effective to preserve the color, odor and flavor of the grain, and to minimize the corrosiveness of the aforementioned sulfur dioxide treatment. Concurrent application of carbon dioxide gas and ammonia gas is also disclosed as reducing sprouting.

6 Claims, No Drawings

METHODS OF PREVENTING GRAIN SPROUTING AFTER HARVEST THROUGH THE APPLICATION OF SULFUR DIOXIDE, NITROGEN AND AMMONIA GASES

CROSS-REFERENCE TO RELATED APPLICATIONS

The present application is a continuation-in-part of our prior co-pending patent application entitled, "Liquid Antimicrobial Treatment for Storage Grain", Ser. No. 156,501, filed June 4, 1980, now U.S. Pat. No. 4,309,451, which is a division of our prior co-pending application Ser. No. 050,162, filed June 20, 1979, now abandoned, which applications are hereby incorporated by reference as if fully set forth herein.

The present application is also a continuation-in-part of our prior co-pending patent application entitled, "Gaseous Antimicrobial Treatment of Storage Grains", Ser. No. 038,739, filed May 14, 1979, now abandoned, which application is hereby incorporated by reference as if fully set forth herein.

The present application is related to our co-pending patent application entitled, "Liquid Antimicrobial Treatments for Storage Grain", Ser. No. 163,413, filed June 26, 1980, which is also a continuation-in-part of the aforementioned patent applications. The present application is also related to our co-pending patent application entitled, "Gaseous AntiMicrobial Treatments for Storge Grain", Ser. No. 163,410, filed June 26, 1980, which is also a continuation-in-part of the aforementioned patent applications. Each of these related applications is hereby incorporated by reference as if fully set forth herein.

BACKGROUND OF THE INVENTION

The present invention relates to the field of preservative treatments of grains during storage, and more particularly, to treatments applied to grains containing more than about 15% moisture, to prevent sprouting which might otherwise result.

It is often advantageous to store grains such as corn, wheat, sorghum and the like after harvest and prior to their eventual conversion into products such as flour, molasses, etc. Unfortunately, without some form of treatment after harvest, most grain will spoil, particularly when stored in semi-closed conditions, such as grain storage bins, elevators, etc. After harvest, most grain contains approximately 20% to 25% moisture. This moisture content is sufficient to promote microbial growth, such as fungi and mold growth, which may very rapidly cause spoilage of the stored grain.

One treatment for preserving grain during storage which has achieved considerable success is the rapid drying of grain through the application of heat, such as hot air, which reduced the moisture content of that grain to below about 15%. At this moisture content, grain may be stored for extended periods of time while retaining suitable odor, flavor, and color characteristics. Unfortunately, this technique normally requires the consumption of substantial amounts of energy which is used to provide the heat necessary for quick drying of grain to be preserved in this manner. Accordingly, a substantial need has arisen for alternative preservative treatments which may be used either alone or in combination with ambient air drying techniques, to thereby provide an energy efficient method of treating grain for storage.

Another treatment for preserving grain which has achieved some commercial success is the use of propionic acid. This treatment normally entails the provision of less than 2%, usually about 1%, by weight of propionic acid to the grain to be treated. While this method is effective for inhibiting microbial growth, grain treated with these amounts of propionic acid has an objectionable taste and color, and therefore may not be sold for human consumption. Nonetheless, under E.P.A. regulations, grain containing not more than 2% propionic acid can be sold for animal fodder. It is estimated that propionic acid treatment is not used on more than about 1% of the grains stored in the United States.

It has also been suggested to treat grains during storage with various gases. According to one process, ammonia gas is slowly "trickled" through grain to be treated. Unfortunately, this treatment discolors the treated grain, producing a darkened product. Accordingly, grain treated with an ammonia gas trickle process is permitted only for animal consumption.

Another gas which has been suggested for use in preserving grains is sulfur dioxide. Not surprisingly, sulfur dioxide gas, while exhibiting preservative effects, may produce some odor and flavor problems in the treated grain. Additionally, treatments with sulfur dioxide gas are extremely corrosive on storage equipment, presumably as the result of sulfurous and sulfuric acids which are formed within the moist treatment environment.

The above described treatments, and other chemical materials, have been described in various publications as exhibiting preservative or pesticidal effects:

For various patents referring to the use of gases, such as ammonia gas or sulfur dioxide gas, please see U.S. Pat. No. 1,777,044 (Legendre) (grain preserved through treatment with ammonia gas, sodium carbonate or alkaline-reacting gas by adjusting the hydrogen ion concentration of the adherent moisture to a point within the range pH 7–10.); U.S. Pat. No. 3,928,577 (Kochurova et al) (vegetable food products, flower bulbs, plants, etc. preserved with tablets containing potassium metabisulfite, gelatin or starch, stearic acid and salts thereof which are described as replacing use of sulfur dioxide, potassium metabisulfite, sulfurous acid and sodium bisulfite prior art techniques); U.S. Pat. No. 1,524,494 (Warth) (sulfur dioxide or other gases such as hydrocyanic acid gas, carbonic acid gas, and chlorine disclosed as treatments for composition cork to destroy or prevent the development of mold spores, bacteria, fungus growths, yeasts, insect larvae, etc.); U.S. Pat. No. 2,132,786 (Hockenyos) (sulfur dioxide intermixed with carbon dioxide for use as fumigant for carpet beetles, moths, bedbugs, etc.); U.S. Pat. No. 2,912,793 (Stone et al) (soil treatment to reduce nematode populations comprising injection of sulfur dioxide substantially below the surface of the soil followed by a soil pH adjustment by application of an alkaline fertilizer, such as anhydrous ammonia, calcium oxide, etc.).

Organic acids, such as decanoic, undecylenic, and acetic acids, have also been suggested in the literature as treatments for storage grains:

In U.S. Pat. No. 3,962,475 a method is disclosed for preserving high moisture content agricultural grains comprising treating grains with, (1) a composition consisting essentially of an organic food-grade acid or phosphoric acid, (2) a water soluble, noncorrosive, nontoxic, alkali or alkaline earth metal sulfate salt, and (3) a synthetic organic cationic or anionic surfactant for enhancing the penetration of said acid into said grains. In accordance with this disclosure, exemplary organic acids include propionic and acetic acids, while exemplary alkali or alkaline earth metal sulfate salts particularly include such sulfate salts as sodium and potassium sulfates.

In U.S. Pat. No. 3,404,987 (Kooistra et al), a preserving agent, such as propionic acid, sorbic acid, benzoic acid (and its methyl- and ethyl esters) and a potentiating agent, typically an edible mineral salt, such as the phosphates, carbonates, chlorides, nitrates, sulfates, pyrophosphates and hydroxides of iron, manganese, zinc, tin and silver, are disclosed as being effective in inhibiting microbial growth in food systems. In this patent, the cooperative effect between the preserving agent and potentiating agent is described as exhibiting outstanding activity against microorganisms.

Another chemical which has been reported in the literature as exhibiting a preservative effect is ammonium bisulfite. In *Chemical Abstracts*, Vol. 87, No. 19, p. 451 (1977) preservation with 0.4% ammonium bisulfite ($NH_4HSO_3$) of oat-pea, corn, clover-timothy, or alfalfa silage containing 72–84.6% water was described as improving feed quality. Preservation was described as increasing the soluble sugar, nitrogen and lactic acid content of the feeds and of preventing butyric acid formation. Good results were also reported by mixing corn with straw (5:1, 67.3% moisture) and treating the mixture with 0.4% ammonium bisulfite. Similarly, in *Chemical Abstracts*, Vol. 66, No. 7, p. 2616 (1967) (Abstract 27779K) selected preservatives were tested to determine the pH of a 1% solution, acidity of buffer value, and the preserving properties of selected preservatives. The preserving capacity was determined by the degree of suppression of germination of moist grain, the growth of mold, the activities of oxidative-reductive, proteolytic, and amylolytic enzymes. Thiourea, ammonium bisulfate ($NH_4HSO_3$), a mixture of urea and $NH_4$ pyrosulfate, and ammonium bisulfate ($NH_4HSO_4$) were described as good preservatives which enriched green matter with nitrogen and sulfur. Other ammonia containing compounds were described as weak preservatives. Of these compounds, ammonium bisulfite, ammonium bisulfate, and ammonium chloride ($NH_4Cl$) were recommended for further study and industrial tests. Finally, in *Chemical Abstracts*, Vol. 72, No. 1 (1970), p. 203 (Abstract No. 2303m) various sulfur preparations were described as preserving green fodder. Among these, liquid sulfur dioxide, $NaHS_2O_3$ and an 80% solution of $NH_4SO_3$ were tested at given doses. Upon comparison with "conventional methods", strong decomposition of all soluble carbohydrates was inhibited, the latent phase of fermentation was prolonged, total traceable acidity was decreased, and the formation of volatile and non-volatile organic acids was suppressed. The resultant silage was considered to be superior to conventional silages in organoleptic properties, as well as in maintenance of its structure. Preservation with sulfur preparations was described as reducing the loss of nutritive substances by 50%.

It is known to commercially prepare ammonium bisulfite by bubbling ammonia and sulfur dioxide into water, forming an essentially 100% yield of pure ammonium bisulfite solution having a pH of about 5.5. Aqueous solutions of 47–50 weight percent of ammonium bisulfite are thus readily available. Upon extended storage, particularly when exposed to air, ammonium bisulfite is known to spontaneously undergo various "disproportionation" reactions. For various discussions of these disproportionation reactions, their kinetics, and the products which result therefrom, please refer to the following articles, each of which are hereby incorporated by reference:

Landrooth et al, *Thermodynamics*, Vol. 88, 1976, p. 427, "Thermodynamics of the reaction of ammonia and sulfur dioxide in the presence of water vapor";

Zelionkaite et al, *Chemical Abstracts*, Vol. 76, 1972, p. 329, "Decomposition of Ammonium hydrosulfite solutions under the action of thiosulfate";

Scargill, *Air Pollution and Industrial Hygiene*, Vol. 75, 1971, p. 167, "Dissociation constants of anhydrous ammonium sulfite and ammonium pyrosulfite prepared by gas phase reactions";

Chertkov, *Chemical Abstracts*, Vol. 53, 1959, Cols. 22770–22771, (citing *Zhur. Priklad. Khim.* 32, 1695–1707, 1959), "Kinetics of the autodecomposition of ammonium bisulfite-sulfite solutions";

Chertkov, *Zhur. Priklad. Khim.* 32, 1732–1742, 1959, "Kinetics of Spontaneous Decomposition of Ammonium Sulfite-Bisulfite Solutions";

Najbar et al, *Catalyst, Kinetics*, Vol. 78, 1973, p. 309, "Kinetics and stoichiometry of the heterophase reaction sulfur dioxide with ammonia";

Hisatsune, *Chemical Abstracts*, Vol. 83, 1976, p. 600, "Infrared spectroscopic study of the ammonia-sulfur dioxide-water solid state system";

Mizoguchi et al, *Bulletin of the Chemical Society of Japan*, Vol. 49(1), 1976, pp. 70–75, "The Chemical Behavior of Low Valence Sulfur Compounds. X[1]) Disproportionation of Thiosulfate, Trithionate, Tetrathionate and Sulfite under Acidic Conditions";

Chertkov et al, *Soviet Chemical Industry* (English Translation), Vol. 49(6), 1973, pp. 383–387, "Spontaneous Decomposition of Concentrated Ammonium Sulfite—Bisulfite Solutions";

*Encyclopedia of Chemical Technology*, Vol. 14, pp. 90–91, edited by Raymond E. Kirk and Donald F. Othmer, published by The Interscience Encyclopedia, Inc., New York, "Thionic Acids";

Goehring et al, *Zeitschrift fuer anorganische und allgemeine Chemie*, Vol. 263, 1950, pp. 138–144, "Ueber die Einwirkung von Schwefeldioxyd auf Ammoniak";

M. Goehring, *Ergebnisse and Probleme der Chemie der Schwefelstickstoffverbindungen*, Akademie Verlag, Berlin, 1957.

These "disproportionation" reactions apparently cause ammonium bisulfite to be oxidized and disproportionated into several other compounds, which contribute to a solution exhibiting a lowered pH. Analysis of ammonium bisulfite which had aged for several years indicated that up to 20–30% may have been converted to ammonium bisulfate, and minor amounts of thiosulfate, metabisulfite, dithionate, imidodisulfonate, and various polythionates. In addition to a lowered pH, a disproportionated solution of ammonium bisulfite exhibits a yellow-greenish color which is not exhibited by a "fresh" (undisproportionated) aqueous solution of ammonium bisulfite.

As seen from the above, while many efforts have been made to provide preservatives which are suitable for use in preserving grains, no chemical preservative has yet been found which provides an efficient, low cost method of preserving grains, while maintaining or enhancing the color, odor and flavor characteristics of those grains so that the treated grains remain suitable for human consumption.

In addition to microbial spoilage, another problem involved in storing grains, particularly wheat, is sprouting during storage. See "Sprouting in Hard Red Spring Wheat", Ibrahim et al, *Bakers Digest*, October 1979, pp. 17-19. It is known that wheat having moisture in excess of about 15%, and approaching 25-30%, is prone to sprouting. The kernels of such wheat also exhibit very high alpha-amylase activities. Even if visible sprouting does not occur, the alpha-amylase contents may be considerably elevated as the result of high moisture levels. Flour milled from sprouted wheat contains relatively high levels of alpha-amylase and relatively lower levels of beta-amylase. Such wheat is considered to exhibit poor baking characteristics and is generally disliked by bakers. Flour from sound (unsprouted) wheat contains an adequate quantity of beta-amylase, and is generally preferred by bakers.

Alpha-amylase is an enzyme which catalyzes carbohydrate hydrolysis to yield simple sugars which are the primary metabolites of yeast. Thus, during the baking process, amounts of alpha-amylase are often carefully controlled through the supplementation of naturally occurring cereal alpha-amylase with fungal alpha-amylase, which is sold as a baking additive.

Important differences exist between fungal alpha-amylase baking additives and natural cereal or bacterial alpha-amylases, which may be present in higher concentrations in sprouting grain. Natural cereal or bacterial alpha-amylases are not readily denatured at higher temperatures, as is fungal alpha-amylase. Accordingly, during the baking process, natural cereal or bacterial alpha-amylase activity continues during the baking process whereas fungal alpha-amylase activity quickly terminates at the beginning of the baking process. Accordingly, controlled additions of fungal alpha-amylase are preferred by bakers over the use of flours which may have unacceptably high concentrations of cereal or bacterial alpha-amylase. For these reasons, methods for preventing or arresting sprouting (or germination) of moist grains, particularly wheat, are of considerable importance to the grain and baking industry.

SUMMARY OF THE INVENTION

The present invention provides novel methods for treating grain to prevent sprouting. These methods include the application of sulfur dioxide gas to the grain in amounts which are effective to prevent sprouting. In accordance with the preferred embodiment of the present invention, nitrogen gas is applied to the grain to enhance the anti-sprouting activity of sulfur dioxide, which is concurrently perfused through the grain mass for a minimum reaction time at room temperature of about 10 minutes. Ammonia gas may be subsequently perfused into the treated grain mass in amounts which are effective to preserve the color, odor and flavor of the grain, and to minimize the corrosiveness of the aforementioned sulfur dioxide treatment. When nitrogen gas is used, it has been found that substantially lower amounts of sulfur dioxide are effective to prevent or arrest wheat sprouting. Although applications of ammonia gas with or immediately after sulfur dioxide applications may lessen the anti-sprouting effect otherwise resulting from such sulfur dioxide applications, ammonia gas applications which are delayed for between 10 minutes to 2 days after applications of sulfur dioxide do not interfere with such sulfur dioxide activity.

In accordance with an alternate embodiment of the present invention, aqueous acidified bisulfite solutions may be applied to grain to prevent sprouting. The preferred solutions are acidified to a pH range of between about 2.5 to 4.0. Suitable bisulfites include sodium bisulfite, potassium bisulfite, calcium bisulfite, or ammonium bisulfite.

Accordingly, a primary object of the present invention is the provision of a novel method for treating grain, particularly wheat, to prevent sprouting.

Another object of the present invention is the provision of methods to treat grain, particularly wheat, to arrest sprouting.

A further object of the present invention is the provision of simple gaseous treatments which produce products which remain suitable for human consumption.

A further object of the present invention is the provision of methods for preventing grain sprouting which otherwise aid in the preservation of the treated grain.

These and other objects of the present invention will become apparent from the following more detailed description.

DESCRIPTION OF THE PREFERRED EMBODIMENTS

While particular examples have been selected for the purposes of illustration, one of ordinary skill in the art will recognize from the information set forth herein that the materials and methods of the present invention are applicable to a wide variety of treatment circumstances. Accordingly, one of ordinary skill in the art will recognize that various modifications may be made to the specific materials and concentrations described hereinafter without departing from the scope of the present invention, which is defined more particularly in the appended claims.

In accordance with the preferred embodiments of the present invention, sulfur dioxide, nitrogen, and ammonia gas, when applied are used in the following amounts, as measured at standard temperature and pressure:

sulfur dioxide: 0.1-1.0 liters per kilogram of grain;
nitrogen: 0.1-1.0 liters per kilogram of grain;
ammonia gas: 0.1-1.0 liters per kilogram of grain.

In testing the materials and methods of the present invention, various experimental techniques were employed to determine the effectiveness of control and test compositions on samples of moist wheat. Unless otherwise specified, all wheat samples tested were adjusted to a hydration of about 40% moisture. Further all controls were surface sterilized with 5% NaOCl, which is a normal procedure for sprouting studies to prevent microbial interference due to mold growth. Such surface sterilization was not necessary to test samples due to the antimicrobial effects of the test treatments. The following tests on wheat correspond to similar results obtained in prior experimentation with corn.

Initial testing was carried out with hard wheat which was soaked in water to facilitate sprouting. The soaked wheat was then subjected to gas treatments and placed over moist filter papers in Petri dishes. These Petri dishes were incubated at 37° C. for two days, at the end of which the number of sprouted kernels were counted and percentage sprouting calculated. The results are set forth in Table I.

TABLE I

| Example | Treatments per 100 g Wheat | % Sprouting |
|---|---|---|
| 1 | Control | 70 |
| 2 | 100 ml $SO_2$ | 0 |
| 3 | 50 ml $SO_2$ | 0 |
| 4 | 50 ml $NH_3$ | 45 |
| 5 | 50 ml $SO_2$ + 50 ml $NH_3$ | 1.3 |
| 6 | 50 ml $NH_3$ + 50 ml $SO_2$ | 25 |
| 7 | 60 ml $SO_2$ | 0 |
| 8 | 60 ml $SO_2$ + 60 ml $NH_3$ | 0 |
| 9 | 70 ml $SO_2$ | 0 |
| 10 | 70 ml $SO_2$ + 70 ml $NH_3$ | 0 |

As seen from Example 1 (control), about 70% sprouting will occur in the absence of an effective treatment. Treatments with 50 ml of ammonia gas per 100 g of wheat reduced sprouting to 45%. Applications of sulfur dioxide gas or sulfur dioxide gas followed by equivalent volumes of ammonia gas, proved to be quite effective (see Examples 2, 3, 5, 7, 8, 9, and 10). The importance in the order of application of such gases is demonstrated by Example 6, wherein comparatively reduced effectiveness was demonstrated when an application of ammonia gas was immediately followed by sulfur dioxide.

A similar experiment on wheat was conducted where wheat was allowed to sprout first, and then was subjected to the above treatments. The results obtained indicated that each of the above treatments were correspondingly effective in arresting further sprouting.

To investigate the effect of the above-mentioned treatments on dry grain, wheat containing less than about 15% moisture was treated with 50 ml of sulfur dioxide followed by 50 ml of ammonia gas per 100 g. The wheat was then soaked and permitted to incubate, whereupon 100% sprouting was observed, as compared with 1.3% for the pre-soaked wheat. Accordingly, it was determined that higher amounts of gases may be needed to prevent 100% sprouting when treating dry wheat.

In order to further investigate the effects of applications of individual gases and gas combinations, soaked wheat was subjected to the following treatments and treatment combinations, as indicated in Table II.

TABLE II

| Example | Treatments/100 g Wheat | % Sprouting |
|---|---|---|
| | *Effects of Single Gases* | |
| 11 | Control | 84 |
| 12 | $CO_2$ (100 ml) | 78 |
| 13 | $N_2$ (100 ml) | 90 |
| 14 | $NH_3$ (100 ml) | 80 |
| 15 | $SO_2$ (100 ml) | 0 |
| 16 | $SO_2$ (80 ml) | 0 |
| 17 | $SO_2$ (60 ml) | 0 |
| 18 | $SO_2$ (50 ml) | 0 |
| 19 | $SO_2$ (40 ml) | 0 |
| 20 | $SO_2$ (30 ml) | 3 |
| 21 | $SO_2$ (20 ml) | 20 |
| 22 | $SO_2$ (8 ml) | 38 |
| 23 | $SO_2$ (4 ml) | 72 |
| | *Effects of Gas Combinations* | |
| 24 | $CO_2$ (50 ml) + $SO_2$ (20 ml) | 20 |
| 25 | $CO_2$ (50 ml) + $SO_2$ (30 ml) | 6 |
| 26 | $CO_2$ (50 ml) + $SO_2$ (50 ml) | 0 |
| 27 | $N_2$ (50 ml) + $SO_2$ (20 ml) | 6 |
| 28 | $N_2$ (50 ml) + $SO_2$ (30 ml) | 0 |
| 29 | $N_2$ (50 ml) + $SO_2$ (50 ml) | 0 |
| 30 | $NH_3$ (50 ml) + $CO_2$ (50 ml) | 25 |
| 31 | $NH_3$ (80 ml) + $SO_2$ (40 ml) + $CO_2$ (40 ml) | 25 |
| 32 | $SO_2$ (30 ml) + $N_2$ (50 ml) | 8 |
| 33 | $SO_2$ (10 ml) + $N_2$ (50 ml) | 35 |
| 34 | $SO_2$ (20 ml) + $N_2$ (40 ml) | 12 |
| 35 | $SO_2$ (20 ml) + $N_2$ (20 ml) | 4 |
| 36 | $SO_2$ (20 ml) + $N_2$ (10 ml) | 9 |
| 37 | $SO_2$ (10 ml) + $N_2$ (50 ml) | 73 |
| 38 | $SO_2$ (10 ml) + $N_2$ (40 ml) | 75 |
| 39 | $SO_2$ (10 ml) + $N_2$ (100 ml) | 75 |
| 40 | $SO_2$ (50 ml) + $NH_3$ (50 ml) | 0 |
| 41 | $SO_2$ (40 ml) + $NH_3$ (40 ml) | 1 |
| 42 | $SO_2$ (30 ml) + $NH_3$ (30 ml) | 7 |
| 43 | $SO_2$ (20 ml) + $NH_3$ (20 ml) | 80 |
| 44 | $N_2$ (50 ml) + $SO_2$ (40 ml) + $NH_3$ (40 ml) | 1 |
| 45 | $N_2$ (50 ml) + $SO_2$ (30 ml) + $NH_3$ (30 ml) | 6 |
| 46 | $SO_2$ (20 ml) + $N_2$ (50 ml) + $NH_3$ (20 ml) | 1 |
| 47 | $N_2$ (50 ml) + $SO_2$ (20 ml) + $NH_3$ (20 ml) | 13 |
| 48 | $SO_2$ (40 ml) + $N_2$ (40 ml) + $NH_3$ (40 ml) | 4 |
| 49 | $SO_2$ (30 ml) + $N_2$ (30 ml) + $NH_3$ (30 ml) | 36 |
| 50 | $SO_2$ (20 ml) + $N_2$ (20 ml) + $NH_3$ (20 ml) | 82 |

The following conclusions may be drawn from Table II:

(1) Applications of air, carbon dioxide, nitrogen and ammonia gases (Examples 11-14) are not particularly effective to prevent sprouting of moist wheat;

(2) Applications of sulfur dioxide in amounts above 30 ml per 100 g are effective to prevent wheat sprouting (see Examples 15-23);

(3) Carbon dioxide does not effect sprouting inhibition caused by sulfur dioxide (Examples 24-26);

(4) Prior applications of nitrogen gas were shown to enhance the sensitivity of wheat to sprouting inhibition caused by sulfur dioxide (compare Examples 27-29 to Examples 21, 20 and 18);

(5) Applications of ammonia gas and carbon dioxide are more active in combination than either of those gases alone (compare Example 30 to Examples 12 and 14);

(6) When sulfur dioxide gas follows the application of ammonia and preceeds the application of carbon dioxide, the combination is not as effective in preventing sprouting as a sole application of the corresponding volume of sulfur dioxide gas (compare Example 31 to Example 19);

(7) When nitrogen applications follow applications of sulfur dioxide, some improvement in wheat sprouting inhibition percentages may be obtained, particularly when corresponding volumes of sulfur dioxide and nitrogen gas are utilized (compare Examples 34, 35 and 36 to Example 21). Such improvements are dependent upon concentration (amount) and are particularly exhibited with applications of 20 ml of sulfur dioxide. At 10 ml of sulfur dioxide subsequent applications of nitrogen gas produced inferior results (compare Examples 33 and 37-39 to Example 22). Therefore, when only nitrogen gas and sulfur dioxide are utilized to treat the subject grain, sulfur dioxide applications preferably should be in the amounts of about 15-35 ml per 100 g of grain, and more preferably 20-30 ml per 100 g of grain. In these instances, 10-40 ml of nitrogen gas, preferably 20-30 ml per 100 g of grain should be utilized in these treatments;

(8) The effects of ammonia gas treatment when preceeded by sulfur dioxide and nitrogen gas applications are demonstrated in Examples 44-50. When sulfur dioxide gas in amounts of 20–30 ml (Examples 46, 49 and 50) preceeded the application of 50 ml of nitrogen gas which in turn preceeded the application of 20–30 ml ammonia gas, the best results were obtained (Example 46). This may be explained by the fact that the nitrogen gas, in addition to sensitizing the wheat to sprouting inhibition, also aids in the distribution of sulfur dioxide within the grain mass. When nitrogen gas was applied prior to $SO_2$ better results were obtained when ammonia gas was not utilized as part of the treatment. Compare Examples 45 and 47 to Examples 27 and 28. However, in view of the lowered corrosiveness of the treatments, and color, flavor, and taste advantages gained thereby, tests utilizing ammonia gas compare favorably to tests of corresponding amounts of just sulfur dioxide (compare Examples 44, 45, and 47 to Examples 19, 20, and 21, respectively).

(9) Except at low amounts (i.e. 20 ml), applications of $SO_2$ gas followed by ammonia gas produced sprouting percentages comparable to those of just sulfur dioxide gas (compare Examples 40–42 to Examples 18–21).

Thus, Table II clearly indicates that nitrogen gas, sulfur dioxide gas and ammonia gas, the orders of introduction of these gases, and the relative amounts of these gases introduced into the grain mass to be treated, all bear upon the effectiveness of such treatments in preventing and arresting sprouting. From Table II it may also be noted that a substantially concurrent application of ammonia gas with carbon dioxide results in a substantial reduction in sprouting percentages.

In order to investigate the effect of the timing of applications of certain of the above-mentioned gases on sprouting, tests were conducted with controlled time intervals between applications of the below-indicated gases. The results of these tests are set forth in Table III.

TABLE III

| Time Interval for Reversibility of Sprouting by $NH_3$ | | |
|---|---|---|
| Example | Treatments/100 g Wheat | % Sprouting |
| 51 | Control | 80 |
| 52 | $SO_2$ (100 ml) | 0 |
| 53 | $NH_3$ (100 ml) | 80 |
| 54 | $SO_2$ (40 ml) | 0 |
| 55 | $SO_2$ (40 ml) + $NH_3$ (40 ml) immediate | 80 |
| 56 | $SO_2$ (60 ml) + $NH_3$ (60 ml) immediate | 60 |
| 57 | $SO_2$ (100 ml) + $NH_3$ (100 ml) immediate | 0 |
| 58 | $SO_2$ (40 ml) + 10 min. + $NH_3$ (40 ml) | 10 |
| 59 | $SO_2$ (60 ml) + 10 min. + $NH_3$ (60 ml) | 0 |
| 60 | $SO_2$ (40 ml) + 30 min. + $NH_3$ (40 ml) | 0 |
| 61 | $SO_2$ (60 ml) + 30 min. + $NH_3$ (60 ml) | 0 |

Examples 51–54 in Table III are provided as controls. As seen in Examples 55 and 56, simultaneous applications of sulfur dioxide gas and corresponding amounts of ammonia gas cause inhibition of the otherwise expected effect of that concentration of sulfur dioxide gas. As the amount of applied $SO_2$ increases, simultaneous introduction of a corresponding amount of ammonia gas is less effective to inhibit the action of $SO_2$. When ammonia gas application follows the application of sulfur dioxide gas by 10 to 30 minutes the "interference" between $SO_2$ and ammonia gas is not observed (compare Examples 55 and 56 to Examples 58–61). Thus, it may be concluded that delays of at least 10 minutes following the application of sulfur dioxide gas are preferred prior to the introduction of ammonia gas into the grain mass to be treated.

In order to investigate the mechanism by which nitrogen gas application sensitizes grain to the action of sulfur dioxide, wheat (after NaOCl surface sterilization) was transferred to a round bottom flask and enough sterile water was added to rehydrate the wheat to 40% moisture. The air from the round bottom flask was removed by means of a syringe and nitrogen was injected into the round bottom flask, after which the flask incubated over night. The next morning, wheat was removed from the round bottom flask and was subsequently subjected to the following treatments, and plated on Petri dishes to sprout. The results are set forth in Table IV:

TABLE IV

| Effects of Soaking the Wheat in Nitrogen Atmosphere vs Air Atmosphere | | | |
|---|---|---|---|
| | | % Sprouting | |
| Example | Treatments/100 g Wheat | Nitrogen | Air |
| 62 | Control | 96 | 82 |
| 63 | $SO_2$ (20 ml) | 28 | 19 |
| 64 | $SO_2$ (30 ml) | 0 | 0 |
| 65 | $SO_2$ (40 ml) | 0 | 0 |
| 66 | $SO_2$ (20 ml) + $NH_3$ (20 ml) | 69 | 70 |
| 67 | $SO_2$ (30 ml) + $NH_3$ (30 ml) | 15 | 10 |
| 68 | $SO_2$ (40 ml) + $NH_3$ (40 ml) | 8 | 3 |
| 69 | $N_2$ (50 ml) + $SO_2$ (30 ml) | 3 | 5 |
| 70 | $SO_2$ (30 ml) + $N_2$ (50 ml) | 1 | 2 |

When compared to controls which were subjected to similar treatments in air, it will be seen that prior soaking of the grain in nitrogen may slightly stimulate sprouting (see Example 62), but otherwise does not exert any substantial effect on any of the indicated treatments. Thus, it has been concluded that nitrogen gas should be applied to the grain mass substantially concurrently with the application of sulfur dioxide. Preferably, nitrogen gas should be applied to the treated grain mass no earlier than 1 hour before or later than 1 hour after the application of sulfur dioxide, and preferably no earlier than 30 minutes before to 15 minutes after the application of sulfur dioxide.

Other treatments have also been investigated to determine whether sprouting of wheat can be inhibited through the application of other compounds. In Table V, treatments with ammonium bisulfate-acidified ammonium bisulfite and sodium bisulfate-acidified sodium bisulfite were found to be effective except when immediately followed by applications of ammonia gas.

TABLE V

| Example | Treatments/100 g Wheat | % Sprouting |
|---|---|---|
| Effects of $NaHSO_3$ (10% solution - 8% $HSO_3^-$ ion) | | |
| 71 | Control | 80 |
| 72 | $NaHSO_3$ (2.8 ml) pH 4.0 | 6 |
| 73 | $NaHSO_3$ (2.8 ml) pH 3.0 | 6 |
| 74 | $NaHSO_3$ (2.8 ml) pH 4.0 + $NH_3$ (60 ml) | 77 |
| 75 | $NaHSO_3$ (2.8 ml) pH 3.0 + $NH_3$ (60 ml) | 72 |
| 76 | $NaHSO_3$ (5.6 ml) pH 4.0 | 0 |
| 77 | $NaHSO_3$ (5.6 ml) pH 3.0 | 0 |
| 78 | $NaHSO_3$ (5.6 ml) pH 4.0 + $NH_3$ (120 ml) | 37 |
| 79 | $NaHSO_3$ (5.6 ml) pH 3.0 + $NH_3$ (120 ml) | 39 |
| Effects of Ammonium Bisulfite (50% solution) - ($\approx$ 41% $HSO_3^-$ ion) | | |

TABLE V-continued

| Example | Treatments/100 g Wheat | % Sprouting |
|---|---|---|
| 80 | NH$_4$HSO$_3$ (0.4 ml) pH 4.0 | 1 |
| 81 | NH$_4$HSO$_3$ (0.4 ml) + NH$_3$ (60 ml) | 44 |

By way of comparison, the effects of other salts on inhibition of sprouting is set forth in Table VI.

TABLE VI

Effects of Other Salts on Inhibition of Sprouting

| Example | Treatments/100 g Wheat | % Sprouting |
|---|---|---|
| 82 | Control | 85 |
| 83 | 10% Na$_2$SO$_3$ (1.7 ml) pH 9.6 | 83 |
| 84 | 10% NaHSO$_4$ (1.85 ml) pH 1.0 | 84 |
| 85 | 10% K$_2$S$_2$O$_5$ (1.5 ml) pH 3.9 | 40 |
| 86 | 20% Na$_2$SO$_4$ (2.2 ml) pH 8.5 | 85 |
| 87 | 10% Na$_2$SO$_3$ (3.4 ml) + NH$_3$ (60 ml) | 9 |
| 88 | 10% NaHSO$_4$ (3.7 ml) + NH$_3$ (60 ml) | 84 |
| 89 | 10% K$_2$S$_2$O$_5$ (3.0 ml) + NH$_3$ (60 ml) | 43 |
| 90 | 20% Na$_2$SO$_4$ (4.4 ml) + NH$_3$ (60 ml) | 24 |

As seen from Table VI, only Examples 87 and 90 show substantial improvements in percent sprouting.

As seen from the above, numerous simple, inexpensive methods of treating grain, particularly wheat, are disclosed which are effective in preventing and arresting sprouting. When nitrogen gas is utilized in combination with sulfur dioxide gas, surprisingly low volumes of sulfur dioxide gas are effective in preventing sprouting. When ammonia gas is utilized following an application of either sulfur dioxide gas or sulfur dioxide gas and nitrogen gas, a non-corrosive, sprouting-inhibited product fit for human consumption results. Applications of ammonium or sodium bisulfite solutions similarly have been found to prevent sprouting.

I claim:

1. A method of treating storage grain, such as corn, wheat and sorghum to prevent sprouting of said grain under suitable moisture conditions comprising applying nitrogen gas to said grain in amounts sufficient to enhance the anti-sprouting activity of sulfur dioxide with respect to said grain and at about the same time applying sulfur dioxide gas to said grain in amounts effective to prevent said sprouting, whereby the anti-sprouting activity of said sulfur dioxide is effectively enhanced by said nitrogen gas.

2. A method in accordance with claim 1 wherein said nitrogen is applied within one hour of the time of application of said sulfur dioxide gas.

3. A method in accordance with claim 1 wherein said method further comprises the step of subsequently applying ammonia gas to said grain in amounts effective to lower the corrosiveness of the resulting treated grain product.

4. A method in accordance with claim 3 wherein said ammonia gas is applied no earlier than about 10 minutes after the application of said sulfur dioxide.

5. A method in accordance with claim 3 wherein said ammonia gas is applied between about 10 minutes and 2 days after the application of said sulfur dioxide.

6. The method of claim 1 wherein said grain has a moisture content above 15%.

* * * * *